(12) United States Patent
Knapton et al.

(10) Patent No.: US 7,469,540 B1
(45) Date of Patent: Dec. 30, 2008

(54) ENERGY RECOVERY FROM WASTE HEAT SOURCES

(76) Inventors: Brent William Knapton, 19107 Inland Grove Ct., Cypress, TX (US) 77429; Craig A. Beam, 7723 Wycomb La., Houston, TX (US) 77070-3730

( * ) Notice: Subject to any disclaimer, the term of this patent is extended or adjusted under 35 U.S.C. 154(b) by 542 days.

(21) Appl. No.: 11/215,806

(22) Filed: Aug. 30, 2005

Related U.S. Application Data

(60) Provisional application No. 60/605,813, filed on Aug. 31, 2004.

(51) Int. Cl.
*F01K 23/10* (2006.01)
(52) U.S. Cl. .......................... 60/618; 60/653
(58) Field of Classification Search .................. 60/614, 60/616, 618, 653
See application file for complete search history.

(56) References Cited

U.S. PATENT DOCUMENTS

| | | | | |
|---|---|---|---|---|
| 3,061,533 | A | * | 10/1962 | Shannon et al. ............. 376/219 |
| 3,979,914 | A | * | 9/1976 | Weber ......................... 376/402 |
| 5,555,738 | A | | 9/1996 | DeVault |
| 5,842,345 | A | | 12/1998 | Scharpf |
| 6,484,492 | B2 | | 11/2002 | Meholic et al. |
| 6,484,495 | B2 | | 11/2002 | Minami |
| 6,732,525 | B2 | | 5/2004 | Endoh et al. |
| 2002/0148225 | A1 | | 10/2002 | Lewis |
| 2003/0213246 | A1 | * | 11/2003 | Coll et al. ..................... 60/653 |

OTHER PUBLICATIONS

"Technology Characterization: Reciprocating Engines"; Energy Nexus Group; Feb. 2002; 32 pages.
"The Topsoe SCR Denox Unit for Reduction of NOx in Deisel Engine Exhaust Gas using Urea Solution"; Haldor Topsoe A/S, DK-2800 Lyngby, Denmark; date unknown; 14 pages.
"D3616 4400kw tm8871"; Caterpillar Sales data; Sep. 22, 2003; 6 pages.
"Technology Characterization: Reciprocating Engines"; Energy Nexus Group; Feb. 2002; 15 pages.
"Water Pump Performance"; Caterpillar Sales data; Date Unknown; pp. 55, 56, 61, 62, 88, 102.
"Techical Data Engine: 3616 Vee Rating: Generator Set Fuel: Heavy"; Caterpillar Sales data; Date Unknown; pp. 12-13.
"Adsorption Chiller VS Absorptioin Chiller hot water fired"; Printed from the Internet: http://www.wasteheat.com/Library_files/WHS%20Adsorption%20vs%20Absorption.pdf; Date Unknown; 2 pages.

(Continued)

*Primary Examiner*—Hoang M Nguyen
(74) *Attorney, Agent, or Firm*—Meyertons Hood Kivlin Kowert & Goetzel, P.C.; Jeffrey C. Hood; Russell E. Henrichs

(57) ABSTRACT

In some embodiments, three integrated phases may be used to reduce emissions, convert thermal energy into electricity, and cool inlet combustion air. An ammonia injection system may be designed to eliminate extraneous equipment and hazardous re-circulation lines by directly vaporizing, injecting, and mixing ammonia using a specially designed nozzle. The second phase may include using a preheat/vaporizer/superheater exchanger to convert ammonia liquid into a superheated vapor that is then passed through a turbo-expander/generator to produce power. In some embodiments, the third phase may include inlet combustion air chilling.

20 Claims, 12 Drawing Sheets

OTHER PUBLICATIONS

Joh Van Gerpen; "The basics of diesel engines and diesel fuels"; University of Idaho; date unknown; pp. 1-10.

K.J. Rogers, M.G. Milobowski and B.L. Wooldridge; "Persepctives on Ammonia Injection and Gaseous Static Mixing in SCR Retrofit Applications"; EPRI-DOE-EPA Combined Utility Air Pollutant Control Symposium; Aug. 16-20, 1999; 5 pages; Babcock & Wilcox; Barberton, Ohio, U.S.A.

Gilbert Van Bogaert; "Adsorption refrigerator uses low-temperature waste heat"; Caddet Energy Efficiency Newsletter No. 1; 2000; pp. 7-9.

Yoshiharu Amano, Takumi Hashizume, Yoshihaki Tanzawa, Takashi Suzuki, Masashi Akiba and Akira Usui; "A Hybrid Power Generation and Refrigeration Cycle with Ammonia-Water Mixture"; Proceedings of 2000 International Joint Power Generation Conference; Jul. 23-26, 2000; 6 pages.

"Steam Power Cycle"; Printed from the Internet: http://filebox.vt.edu/eng/mech/scott/stream.html; Date Unknown; 3 pages.

Meirong Huang and Kurt Gramoll; "Thermodynamics—Theory"; Printed from the Internet: https://ecourses.ou.edu/cgi-bin/ebook.cgi?doc=&topic=th&chap_sec=10.1&page=theory&appendix=0; Chapter 10, Rankine Cycle; date unknown; 3 pages; University of Oklahoma.

"Removal of NOx from Refinery Off-gases"; Topsoe Catalysts; Date Unknown; 6 pages.

* cited by examiner

Tapered Bore

Flared Spiral-Groove Rotating Disc

251

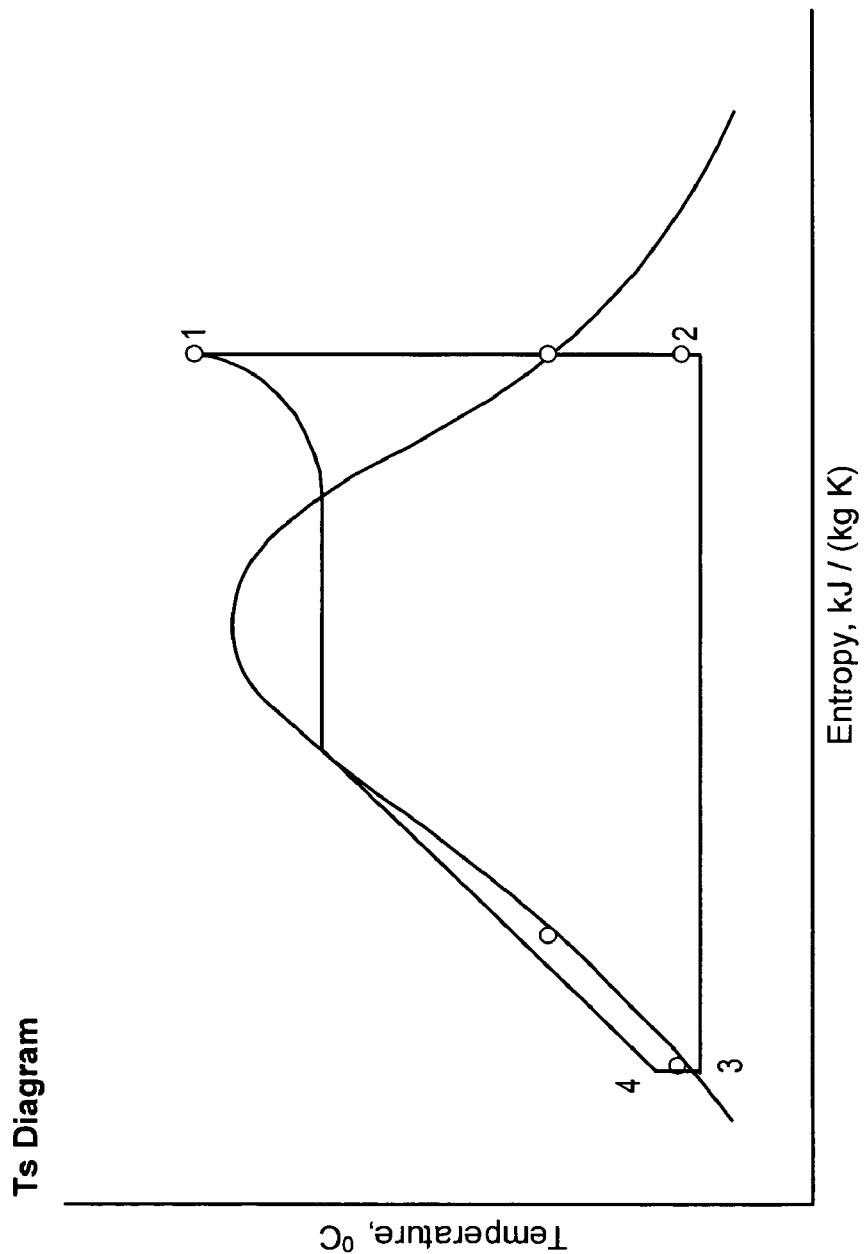

ENERGY RECOVERY FROM WASTE HEAT SOURCES

PRIORITY CLAIM

This application claims benefit of priority of U.S. Provisional Patent Application Ser. No. 60/605,813 titled "Energy Recovery From Waste Heat Sources", which was filed Aug. 31, 2004, whose inventors are Brent William Knapton and Craig A. Beam which is hereby incorporated by reference in its entirety as though fully and completely set forth herein.

BACKGROUND OF THE INVENTION

1. Field of the Invention

The present invention relates generally to engines/turbines and, more specifically, to engine/turbine energy recovery.

2. Description of the Related Art

Large "off-road" diesel engines may be notoriously loud and inefficient. They may convert approximately 40% of available energy in the form of combusted fuel into effective work (or electric power if a generator set is coupled to the engine). Approximately 60% of the energy produced may be waste heat that is either rejected indirectly to the atmosphere via cooling water/air systems or directly released into the environment in the form of hot exhaust (approximately 300-450° C. depending on type of fuel burned). The hot exhaust contributes to thermal, toxic, acidic, and noise pollution.

Catalytic reactors may use ammonia to reduce emissions from diesel engines. In order for ammonia to mix properly in the exhaust stream prior to entering a selective catalytic reduction reactor it may be vaporized. Traditional systems that have injected cool liquid ammonia directly into the hot exhaust stream have encountered plugging of nozzle orifices due to the formation of ammonia bisulfate, a sticky salt substance. The evaporation of ammonia may induce a cooling effect that allows sulfur in the exhaust gas to react with the ammonia to form ammonia sulfate $(NH_4)_2SO_4$ and ammonia bisulfate $NH_4HSO_4$. In order to solve this problem, additional equipment may be added (heaters, tanks, demister pads, etc.) to vaporize ammonia prior to injection. Other systems may re-circulate a hot exhaust slip stream directly into the ammonia system to provide a direct source of vaporization, however, this may create a hazardous combustion condition depending upon the concentration of ammonia being injected.

In traditional large-scale waste heat recovery processes (500 MW +) steam is typically generated for process use or to turn a turbine to produce power. Such bottoming cycles can have relatively high exhaust temperatures and typically are not cooled below acid dew points in order to avoid corrosive formation of sulfuric acid, H2SO4. Unfortunately high concentrations of acidic vapor are released into the atmosphere where eventual cooling and condensation leads to acid rain, a human health hazard and destructive property problem as well.

Because large "off road" diesel engines combust large amounts of fuel, it may be beneficial to reduce the inlet temperature of the combustion air to improve overall efficiency and performance. Traditional systems may use cooling water from cooling towers for gas turbine applications where either evaporative cooling, high pressure fogging, or refrigeration methods are employed.

SUMMARY OF THE INVENTION

In some embodiments, three integrated phases may be used to reduce emissions, recover and convert thermal energy into power, and cool inlet combustion air. In some embodiments, the first phase may be emissions reduction that targets nitrous oxide compounds (NOx), carbon monoxide (CO), uncombusted hydrocarbons ($CH_4$) and large diameter particulate matter (PM). When integrated with the second thermal recovery and conversion phase, more pollutants may be removed such as volatile organic compounds (VOC's), acids such as sulfuric acid ($H_2SO_4$), and additional particulate matter (PM). In some embodiments, an ammonia injection system may be designed to eliminate extraneous equipment and hazardous re-circulation lines by directly vaporizing, injecting, and mixing the ammonia using a specially designed nozzle.

In various embodiments, after emissions have been reduced, the second phase may utilize a modified organic Rankine cycle and provide energy recovery from diesel engine(s) exhaust (5-50 MW range) and auxiliary systems and may convert the recovered energy into usable power. While embodiments are described for a diesel engine, the systems and methods described herein may also be used for other waste heat sources including gas turbines, flue stacks, geothermal sources, etc. In some embodiments, a preheat/vaporizer/superheater device may be used to convert ammonia liquid into a superheated vapor that is then passed through a turbo-expander loaded with a generator to produce electricity. In some embodiments, the system may be designed to operate on a smaller scale and, in order to maximize the thermal energy recovery, the outlet temperature of the exhaust may be brought just below acid dew points. The metallurgy in the equipment may be designed to resist acidic corrosion and reduce the amount of acid that escapes into the atmosphere.

In various embodiments, the third phase may include inlet combustion air chilling. Chilled water from an adsorption process may be used to cool hot ambient combustion air approximately more than 40% to increase diesel engine efficiency and thereby reduce fuel demand and consequently operating costs while improving performance.

BRIEF DESCRIPTION OF THE DRAWINGS

A better understanding of the present invention may be obtained when the following detailed description is considered in conjunction with the following drawings, in which:

FIG. 4A illustrates a temperature versus entropy diagram for the Rankine Cycle based on a single expander, according to an embodiment;

Figure 1:
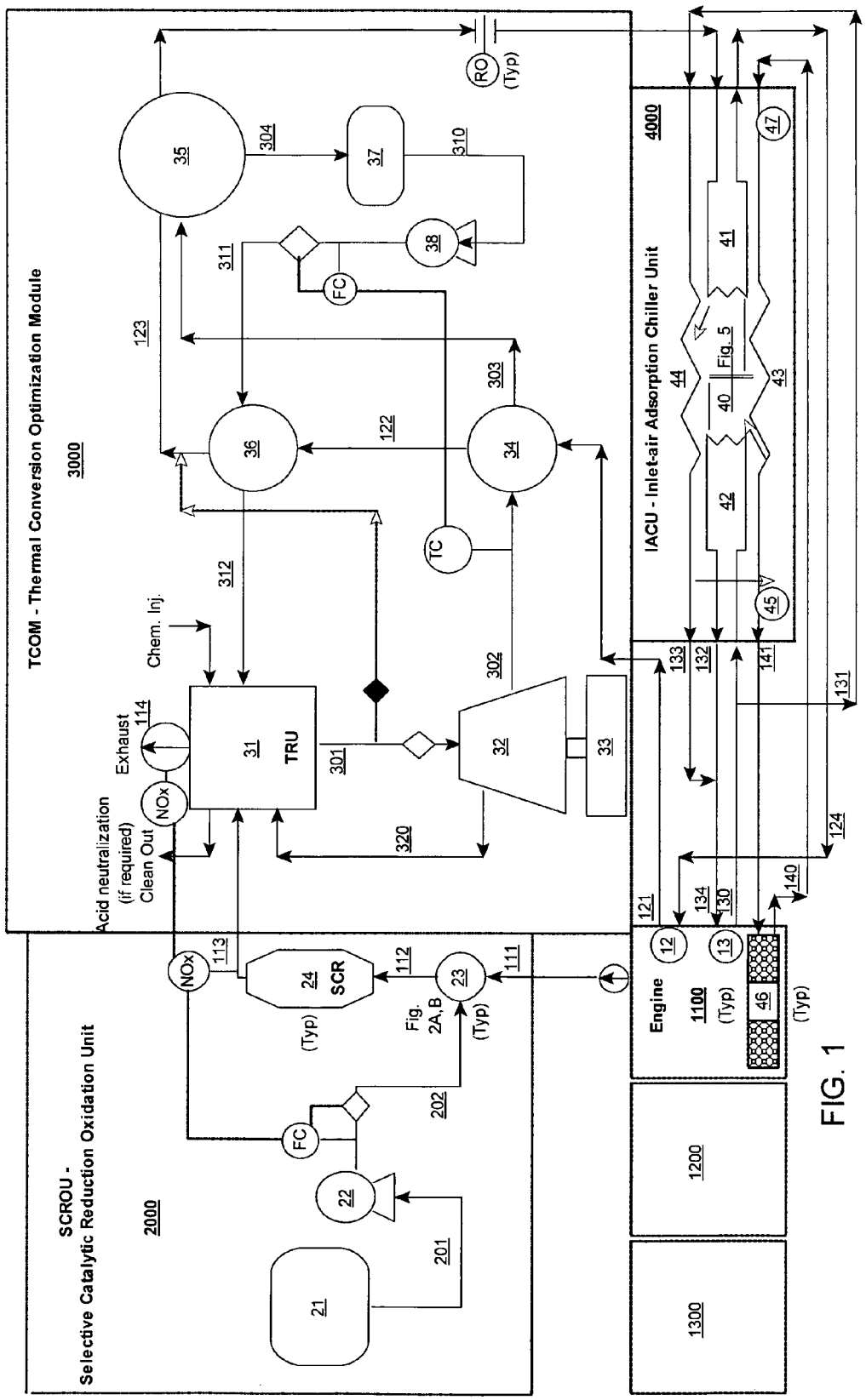
FIG. 1 illustrates a process flow diagram of a stationary diesel engine(s) equipped with emissions reduction, thermal recovery and conversion, and combustion air chiller units, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (e.g., having the potential to or being able to in some embodiments), not a mandatory sense (i.e., must). The term "include", and derivations thereof, mean "including, but not limited to". The term "coupled" means "directly or indirectly connected

DETAILED DESCRIPTION OF THE INVENTION

FIG. 1 illustrates a process flow diagram of a stationary diesel engine(s) equipped with emissions reduction 2000, thermal recovery and conversion 3000, and inlet air chiller 4000 units, according to an embodiment. In some embodiments, three integrated phases may be used to reduce emissions, recover and convert thermal energy, and cool inlet combustion air to improve overall diesel engine efficiency and performance. While embodiments described herein identify a diesel engine, it is to be understood that the following embodiments may be used with other types of engines.

In some embodiments, a reciprocating engine(s) 1100 may be coupled to a Selective Catalytic Reduction Oxidation Unit SCROU 2000 including, in part, a Selective Catalytic Reactor SCR 24 which may act as a partial particulate matter (PM) filter and noise silencer. As used herein and on the FIGs, "(Typ)" stands for typical to indicate more than one expected use in the Figures (i.e., at least parts with a "(Typ)" label may be used multiple times, but only show one part with the "(Typ)" label). "(Typ)" does not indicate typical with respect to the prior art. In addition, temperatures, percentages, etc. provided throughout the specification represent some embodiments. Other temperatures, percentages, etc. are also contemplated.

In some embodiments, the SCROU 2000 may be coupled to a Thermal Conversion Optimization Module TCOM 3000 including, in part, a Thermal Recovery Unit TRU 31, which may also act as a partial particulate matter (PM) filter and noise silencer. In some embodiments, the reagent may be a common working fluid for both the SCROU 2000 and Thermal Conversion Optimization Module TCOM 3000 (e.g., anhydrous ammonia). The SCROU 2000 may include a reagent storage device 21, reagent injection pumps 22, and an Inverted-Cone Slotted-Port injection nozzle ICSP 23 (e.g., see FIGS. 2A and 2B). The ammonia reagent may be thoroughly vaporized and homogeneously mixed into the exhaust via the ICSP nozzle 23 in order to maintain high SCROU 2000 efficiencies and minimize ammonia slip (un-reacted ammonia exiting the selective catalytic reactor SCR 24 due to poor upstream mixing and/or distribution).

Figure 2A:
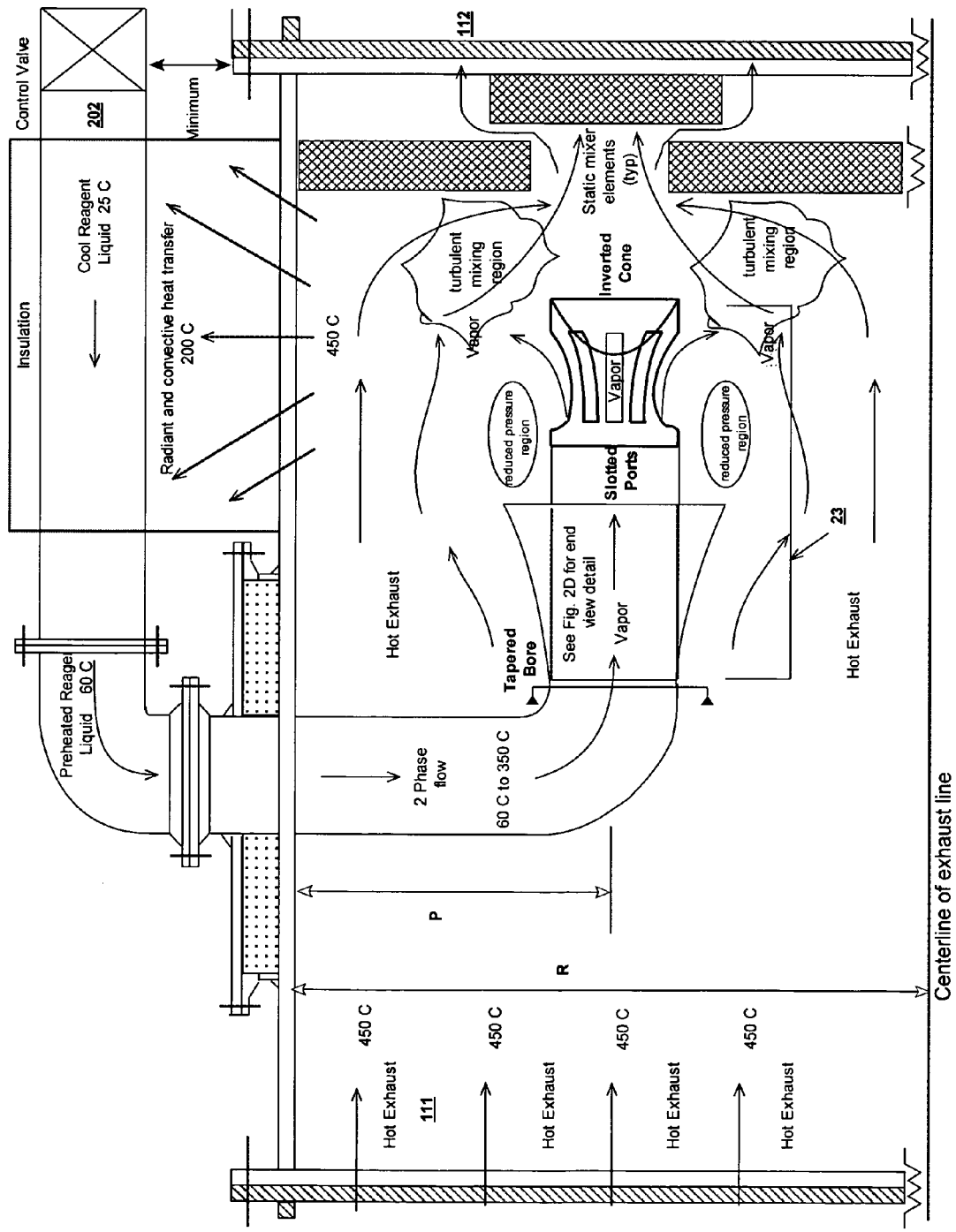
FIG. 2A illustrates an injection nozzle with a tapered bore, according to an embodiment.

In some embodiments, a tapered bore (as seen in FIG. 2A) may redirect an exhaust stream and create a reduced pressure region that may induce the vaporized reagent into the exhaust stream where it may mix in a turbulent, agitated region downstream of the nozzle and just upstream of static mixing elements which may force outer boundary annular exhaust into the mixing zone. In some embodiments, where higher pressures may be available, a flared swirled-groove rotating disc (as seen in FIG. 2B) may redirect the exhaust stream and create a reduced pressure region that may induce the vaporized reagent into the exhaust stream where it may mix in a turbulent, agitated region downstream of the nozzle and just upstream of static mixing elements which may force outer boundary annular exhaust into the mixing zone.

Figure 2B:
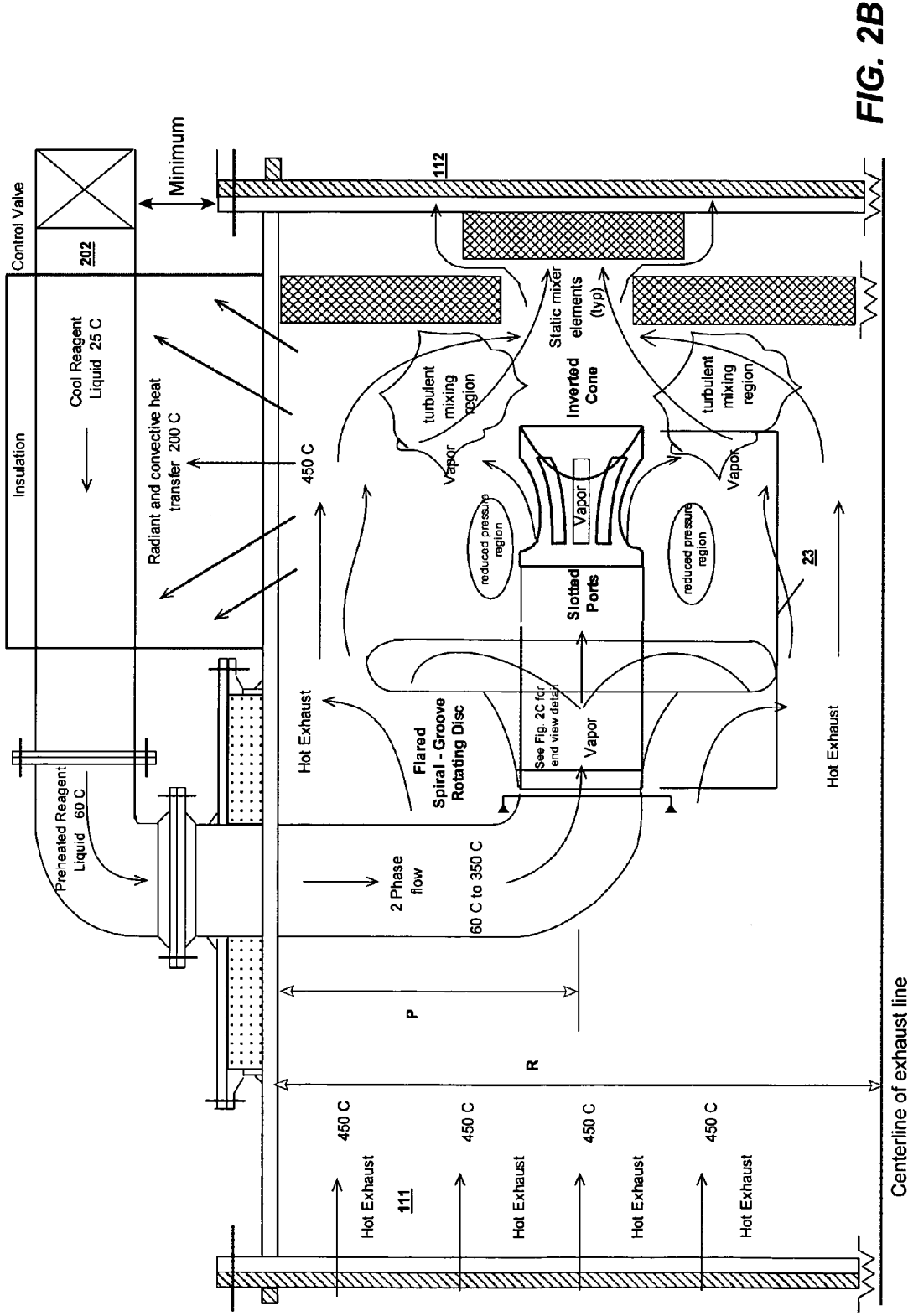
FIG. 2B illustrates an injection nozzle with a rotating disc, according to an embodiment.
Figure 2D:
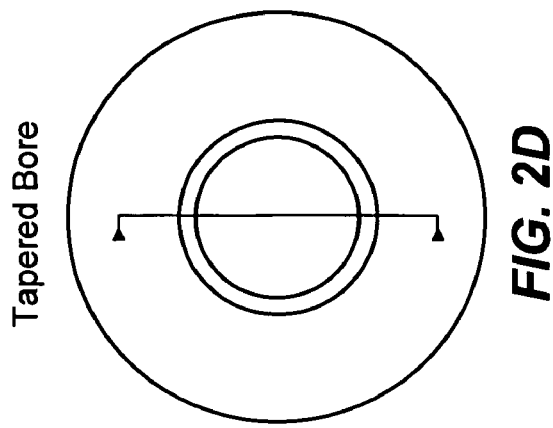
FIG. 2D illustrates end view details of a tapered bore, according to an embodiment.
Figure 2C:
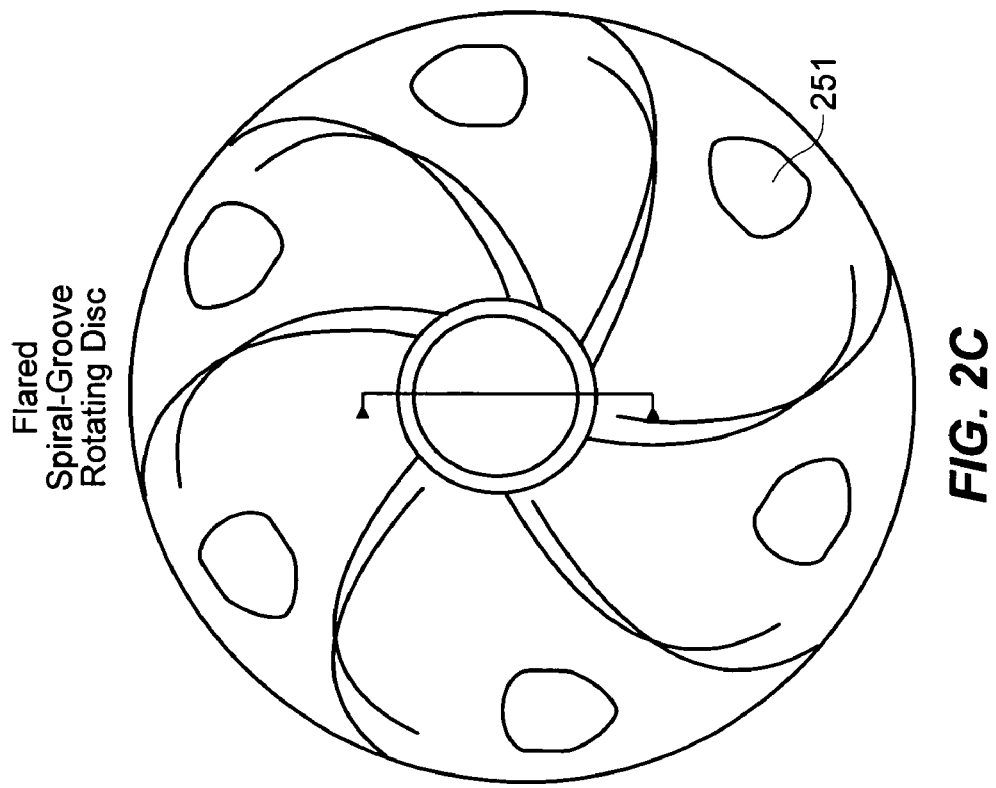
FIG. 2C illustrates end view details of a rotating disc, according to an embodiment.

In some embodiments, as seen in FIG. 2C, the rotating disc may include one or more slots 251. In some embodiments, the rotating disc may be used for higher pressure exhaust streams. The one or more slots may further aid in the creation of turbulence around the downstream inverted-cone slotted-port section of the injection. Other structures and/or configurations may be used in place of or in addition to the tapered bore and/or rotating disc to induce turbulence. An inverted cone and slotted ports may direct reagent vapor tangentially outward perpendicular to the exhaust stream which promotes more surface area contact and enhanced mixing. In some embodiments, the tapered bore (e.g., see end view in FIG. 2D) or flared swirled-groove rotating disc may also shield the slotted ports from the direct exhaust stream which may help prevent plugging. In some embodiments, the tapered bore may be used in low pressure exhaust streams. The ability of the nozzle to direct flow in, for example a 360° circumference, may reduce the number or completely eliminate the use of static mixing elements downstream thereby decreasing overall pressure drop in the system. For smaller exhaust lines, one ICSP injection nozzle located in the centerline (P=R) of the exhaust stream may be sufficient. For medium size lines, two identical ICSP nozzles may be used each approximately ¼ the distance from the side of the exhaust wall (P=0.5×R). Other distances and configurations may also be used. Finally, for large diameter exhaust lines, four identical ICSP injection nozzles may be approximately equally spaced around the circumference, each positioned approximately ¼ the distance from the side of the exhaust wall (P=0.5×R). Other distances and configurations may also be used. In some embodiments, where a plurality of ICSP nozzles are used, the nozzles may not be identical. In addition, other spacing (e.g., distances from the side of the exhaust wall, and spacing around the circumference) and number of nozzles used are also contemplated.

In various embodiments, liquid ammonia reagent 201 stored in tank 21 may be transported by metering pumps 22 adjacent to the exhaust line, 112 and 111, where it is preheated by radiant and convective heat transfer and then enters into the ICSP vaporization/injection/mixing nozzle 23 via stream 202 (e.g., see FIGS. 2A and 2B). In some embodiments, the "cold" reagent injection line 202 may be located adjacent to the "hot" exhaust line 112 and 111 and flow in a counter-current or co-current direction so that radiant and convective heat is transferred to the reagent line 202 to preheat it before it enters the injection nozzle. Hot exhaust stream 111 may contact and mix with ammonia reagent that has been vaporized in ICSP nozzle 23 and flow via stream 112 to the selective catalytic reactor SCR 24. The SCR 24 may be a metal shell that holds various catalyst cartridges. In some embodiments, in this low pressure drop, catalyst filled reactor, nitrogen oxides (NOx) may be reduced to $N_2$ and $H_2O$ vapor in a reaction with ammonia reagent as follows:

$$4NO+4NH_3+O_2 \rightarrow 4N_2+6H_2O$$

$$6NO+8NH_3 > 7N_2+12H_2O$$

Figure 3:
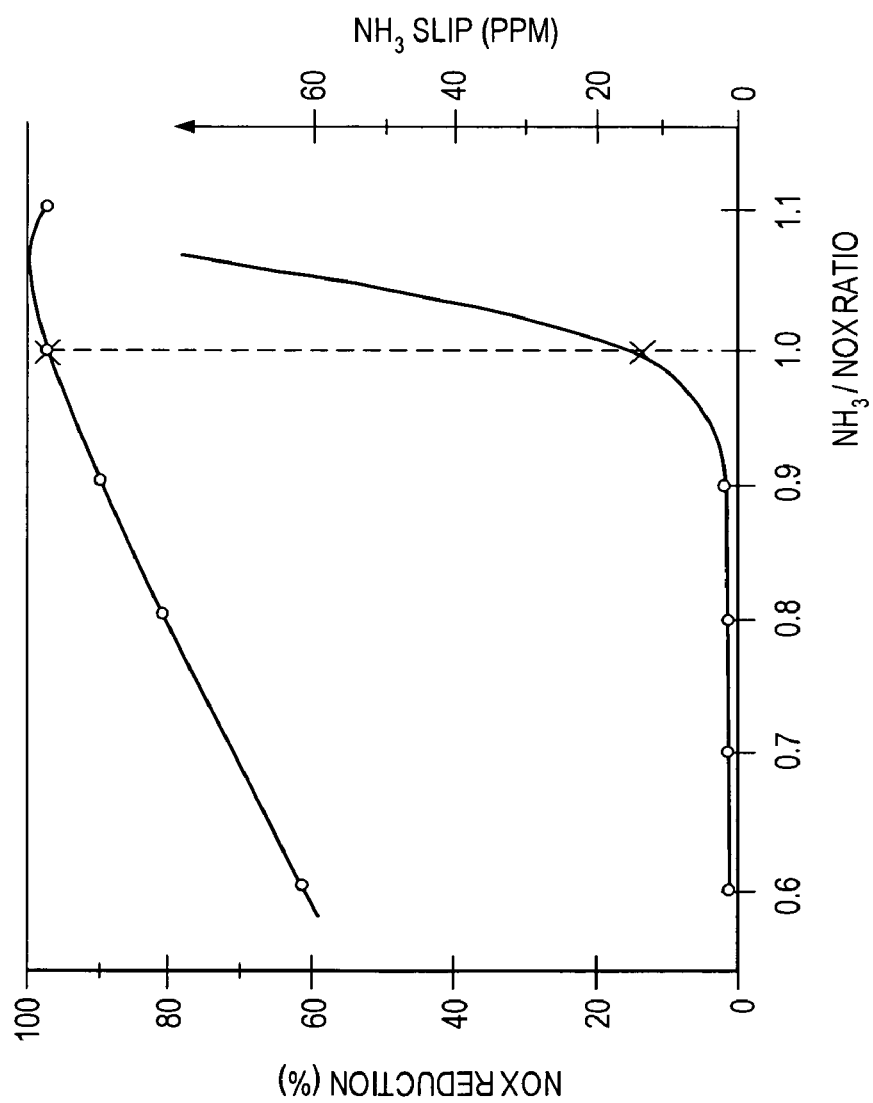
FIG. 3 illustrates NOx reduction percentage and NH3 slip versus NH3/NOx ratios, according to an embodiment.

The products of these reactions (nitrogen and water vapor) may not be pollutants and may be found abundantly in the atmosphere. In various embodiments, the degree of NOx reduction may depend on the amount of catalyst present as well as the amount of ammonia reagent. A common way to represent the second variable is by the ratio $NH_3/NOx$ (e.g., see FIG. 3). The higher the $NH_3/NOx$ ratio, the greater the NOx reduction may be. However, the incidence of ammonia slip may be directly proportional to this ratio. Un-reacted ammonia may "slip" through the reactor and react with $SO_3$ to form undesirable ammonium sulphates if the exhaust is cooled downstream. In some embodiments, controls may be used to control the amount of ammonia injected as well as in combusting low sulfur fuel in the engine to minimize its presence in the exhaust. FIG. 3 indicates, in some embodiments, a $NH_3/NOx$ ratio of approximately 1.0 yields high NOx reduction (approximately 95%) with relatively low $NH_3$ slip (approximately 15 parts per million (ppm)). Any ratio higher than approximately 1.0 may correspond to a dramatic increase in $NH_3$ slip. Systems may design for approximately 90% NOx reduction to keep the $NH_3/NOx$ ratio below approximately 1.0. Other percentages and ratios may also be used.

In various embodiments, to reduce carbon monoxide (CO) emissions and un-combusted hydrocarbons ($CH_4$), an oxidizing catalyst may also be added. The oxidizing catalyst may be placed downstream of the reducing catalyst and oxidize up to approximately 98% of carbon monoxide and trace hydrocarbons to $CO_2$ and $H_2O$ vapor in the presence of excess $O_2$ (other percentages may also be used).

$$CO + \tfrac{1}{2}O_2 \rightarrow CO_2$$

$$CH_4 + 2O_2 \rightarrow CO_2 + 2H_2O$$

$$H_2 + \tfrac{1}{2}O_2 \rightarrow H_2O$$

By adding a second set of reducing catalyst downstream of the oxidizing catalyst, residual NOx that may form in the oxidation process due to ammonia slip may be reduced.

In various embodiments, the treated exhaust travels via stream 113 into the Thermal Recovery Unit TRU 31 where it may transfer heat energy to a preheated ammonia stream 312 in an extended surface, tubular low pressure drop, heat transfer device. The cooled exhaust may exit the TRU 31 as stream 114. The combination of preheated ammonia inlet, reasonable exhaust temperature approach, and multi-pass "tube-side" configuration may mitigate suppressed transfer rates due to film boiling. Because it may be desirable to maximize heat recovery from the exhaust and reduce acid vapor emissions, the exhaust may be brought below acid dew points to condense sulfuric acids. Metallurgy may be selected to resist corrosive acid attack. Empirical studies have shown that significant $H_2SO_4$ condensation may not occur until approximately 30° C. to 40° C. below incipient acid dew points, which typically occur for $H_2SO_4$ between approximately 115° C. and 140° C. In various embodiments, factors that determine $H_2SO_4$ formation may include 1) the sulfur content in the fuel being combusted, 2) the amount of excess air in combustion, 3) the moisture content of the exhaust, and 4) the boiling point of other compounds present in the exhaust. The formation of sulfuric acid may occur as a reaction between sulfur trioxide and water vapor or in a two step reaction between nitrogen oxides, sulfur dioxide, oxygen and water vapor.

$$SO_3 + H_2O \rightarrow H_2SO_4$$

or $$2NO + O_2 \rightarrow 2NO2$$

$$NO2 + SO2 + H2O \rightarrow H2SO4 + NO$$

An acid neutralization system may be connected to the TRU 31 if bulk exhaust temperatures are brought significantly below calculated acid dew points.

In some embodiments, particulate matter (PM) may be trapped by the extended surface design and removed by periodic maintenance. Reduced temperatures and catalyst lined disengaging space in the design may also "knock out" trace volatile organic compounds (VOCs). Superheated ammonia vapor 301 may exit the TRU 31.

In various embodiments, the Thermal Recovery Unit TRU 31 may be coupled to a turbine (e.g., a turbo-expander 32) and generator 33. In some embodiments, other components of the system may include a de-superheater 34, pre-heater 36, a condenser 35, working fluid storage receiver 37, and working fluid supply pumps 38, among others.

In various embodiments, stream 301 may enter turbo-expander 32 where isentropic expansion energy is converted into mechanical energy in the form of high speed shaft rotation. The shaft may be coupled to an electric generator 33 to convert the rotational mechanical energy into electricity. The turbo-expander 32 horsepower output based on an adiabatic efficiency of approximately 86% may be converted into electricity in generator 33 which may have a nominal efficiency of approximately 95% (other nominal efficiencies are also possible). The net result may be that approximately 16% of the available energy in the exhaust stream 111 is converted into usable power (other percentages of converted available energy are also possible). More energy may be recovered and utilized in phase 3. See FIG. 8.

Figure 4B:
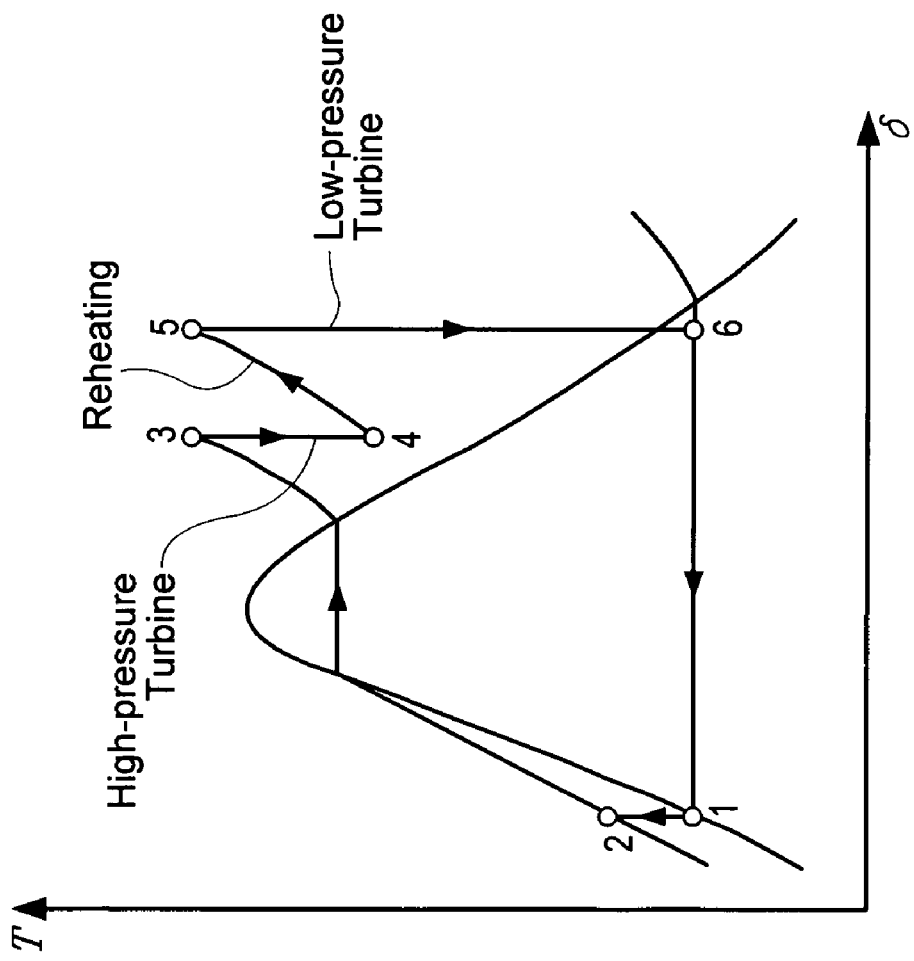
FIG. 4B illustrates a temperature versus entropy diagram for the Rankine Cycle based on inter-stage or multiple expanders, according to an embodiment.

In some embodiments, the thermal recovery and conversion process may be represented by a Ts diagram (temperature vs. entropy) (e.g., see FIGS. 4A and 4B). They show embodiments of modified closed-loop Rankine cycles for the Thermal Conversion Optimization Module 3000 based on a single expander and no re-circulation via stream 320. In FIG. 4A, superheated ammonia vapor may enter the turbo-expander 32 at state 1 where it may expand isentropically (adiabatically and reversibly) to the lower exit pressure at state 2. The partially condensed vapor may then condense at constant pressure and temperature to a saturated liquid at state 3. The saturated liquid may then be pumped to a higher pressure at state 4 and then heated to its saturation temperature, vaporized, and superheated to state 1. FIG. 4B shows the effect of re-circulating a stream 320 from an inter-stage of an expander or between multiple expanders. Ammonia liquid at state 1 is pumped to higher pressure at state 2. The liquid may then heated, vaporized and superheated to state 3. The vapor may then be partially expanded to state 4 where it may be re-circulated back to be superheated to state 5. The superheated vapor may then be fully expanded isentropically to state 6 where it condenses at constant pressure back to state 1.

In some embodiments, heat removed from the ammonia during condensation (e.g., state 1 to 2 in FIG. 4A or state 5 to 6 in FIG. 4B) may be rejected to ambient heat sink via air cooled heat exchangers 35. It should be noted that the overall efficiency may be further increased by transferring latent heat of condensation in 35 to an existing lower temperature process or utility stream, e.g. cooling water. A stream with the appropriate temperature, flow, and pressure parameters may be used to sufficiently condense all the ammonia vapor. In various embodiments, a refrigerant grade heating medium such as ammonia may be used instead of highly flammable and combustible hydrocarbons such as propane or isobutane. This may significantly reduce the risk of explosive hazards during operation. In some embodiments, flexibility in the system design may allow for the condensation of ammonia vapor by either air or cooling water mediums. In some embodiments, a refrigeration system may be utilized instead of air or cooling water condensation to further improve the overall thermal efficiency by condensing ammonia at reduced temperatures which may allow for more energy to be transferred in the turbo-expander 32 located upstream of the de-superheater 34 and condenser, 35.

In some embodiments, the ideal thermal efficiency may approximately equal net power output/heat input=W(net)/Q(in)=(|W(turbo)|−W(pump)|/(Q(pre-heater)+Q(vaporizer/superheater))

$$|W(turbo)|\mu = m(h1-h2)$$

$$|W(pump)| = m(h4-h3)$$

$$(Q(\text{pre-heater})+Q(\text{vaporizer/superheater})) = m(h1-h4)$$

W(turbo)=power out of turbo-expander 32

W(pump)=power into pump 38

Q(pre-heater) and Q(vaporizer/superheater)=respective heat transfer rates for 36 and 31 m=mass flow-rate and h1, h2, h3, and h4 are the enthalpy values for ammonia at each state.

In some embodiments, the overall efficiency of the process may approximately equal (net electric power output+useful heat output)/total fuel input. This will be summarized in detail after examining additional heat recovery application in phase 3. See FIG. 8.

In some embodiments, the expanded and partially condensed vapor stream 302 may be further cooled against jacket water supply stream 121 pumped by jacket water pumps 12, in de-superheater 34 and then travel as stream 303 to be completely condensed in condenser 35 which may feed into receiver 37 via stream 304 where it may be held until transferred to supply pumps 38 via stream 310 and pumped as stream 311 to pre-heater 36 where jacket water from stream 122 preheats the ammonia liquid as stream 312 which enters the TRU 31 and the closed loop, referred to overall as the Thermal Conversion Optimization Module TCOM 3000, is continuously repeated. In some embodiments, the condenser 35 may cool heated engine coolant from the engine(s) 1100, especially if the TRU 31 is offline. Engine coolant may include, for example, jacket water, after-cooler water, or lube oil.

Figure 5:
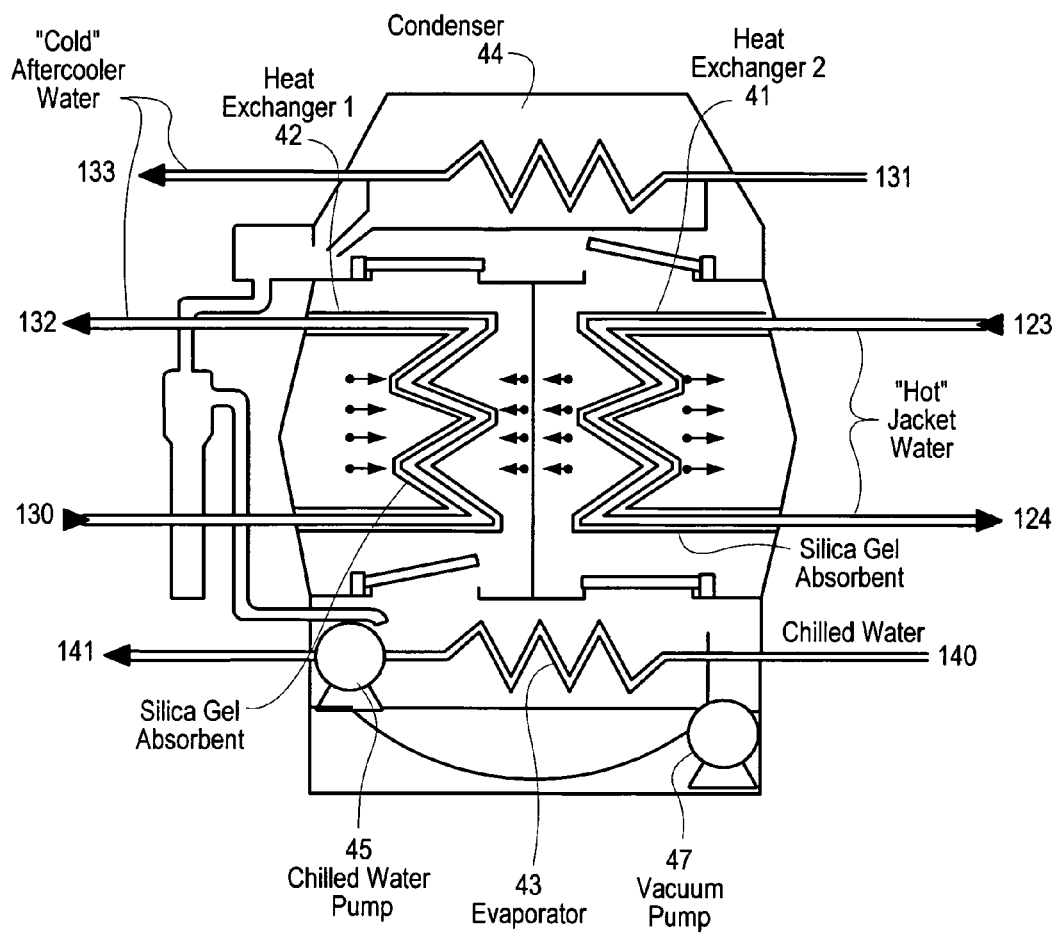
FIG. 5 illustrates an adsorption chiller, according to an embodiment.

In various embodiments, the jacket water stream 123 that exits the TCOM 3000 may enter the Inlet-air Adsorption Chiller Unit IACU 4000 (See FIG. 5). The IACU 4000, in part, may include an adsorption chiller 40. In some embodiments, it may utilize silica-gel adsorption technology to generate chilled water (e.g., a first water stream) thermally driven by the hot jacket water return 123 at approximately 90° C. (other temperatures may also be used). In some embodiments, the unit may have two heat exchangers (which may be identical), 41 and 42 embedded in silica gel adsorption media (e.g., see FIG. 5) "Hot" jacket water 123 (e.g., a second water stream) may flow through one of the exchangers 41 and regenerate the silica gel in a regeneration-desorption mode releasing previously adsorbed water vapor. Then as stream 124, it may flow back to the engine(s) 1100 approximately 5° C. cooler than when it came in, at approximately 85° C. "Cold" after-cooler water (e.g., a third water stream) pumped by after-cooler pumps 13 at approximately 32° C. may flow as stream 130 into the other exchanger 42 and also into condenser 44 as stream 131. In some embodiments, the previously regenerated silica gel in exchanger 42 may adsorb water vapor due to its strong hygroscopic nature. This may be the adsorption mode.

In some embodiments, the after-cooler water may return as stream 132 and combine with stream 133 from the condenser 44 to return to the engine(s) 1100 as stream 134, approximately 5° C. hotter than it came in, approximately 37° C. The two exchangers may be similar. In addition, they may alternate modes when in operation. During the regeneration mode, water vapor from hot silica gel may pass into a condenser 44. On the other side, during the adsorption mode, the colder silica gel may adsorb water vapor from the evaporator 43. In some embodiments, this process may take place at very low partial vapor pressure (approximately 0.01 kg/cm2 (a)) which may lower the surface temperature to approximately 5° C. in the evaporator, thus chilling the water stream which flows through it. Vacuum pump 47 may be used during the startup of the cycle to create the low pressure environment. Stream 140 represents the inlet water for chilling, while stream 141 represents the chilled water which is pumped to and from the engine(s) 1100 by chilled water pumps 45 to cool the ambient inlet combustion air. In some embodiments, the cooling process at the engine(s) 1100 may be accomplished by a bank of extended surface tubes 46 positioned in the inlet air duct which can cool the ambient air from the normal approximately 25° C.-50° C. range, down to approximately 10° C. This may translate into an approximately 2-4% increase in engine efficiency and power. Traditionally adsorption technology has used cooling water from a cooling tower, however, existing cooled after-cooler water from the engine(s) 1100 may be utilized because it may be within the range of temperatures and flowrates necessary for efficient adsorption process. While FIG. 1 illustrates energy recovery from a stationary diesel engine(s), other sources of waste heat such as gas turbines, flue stacks, geothermal sources, etc. may be used instead of or in addition to the stationary diesel engine(s).

Figure 6A:
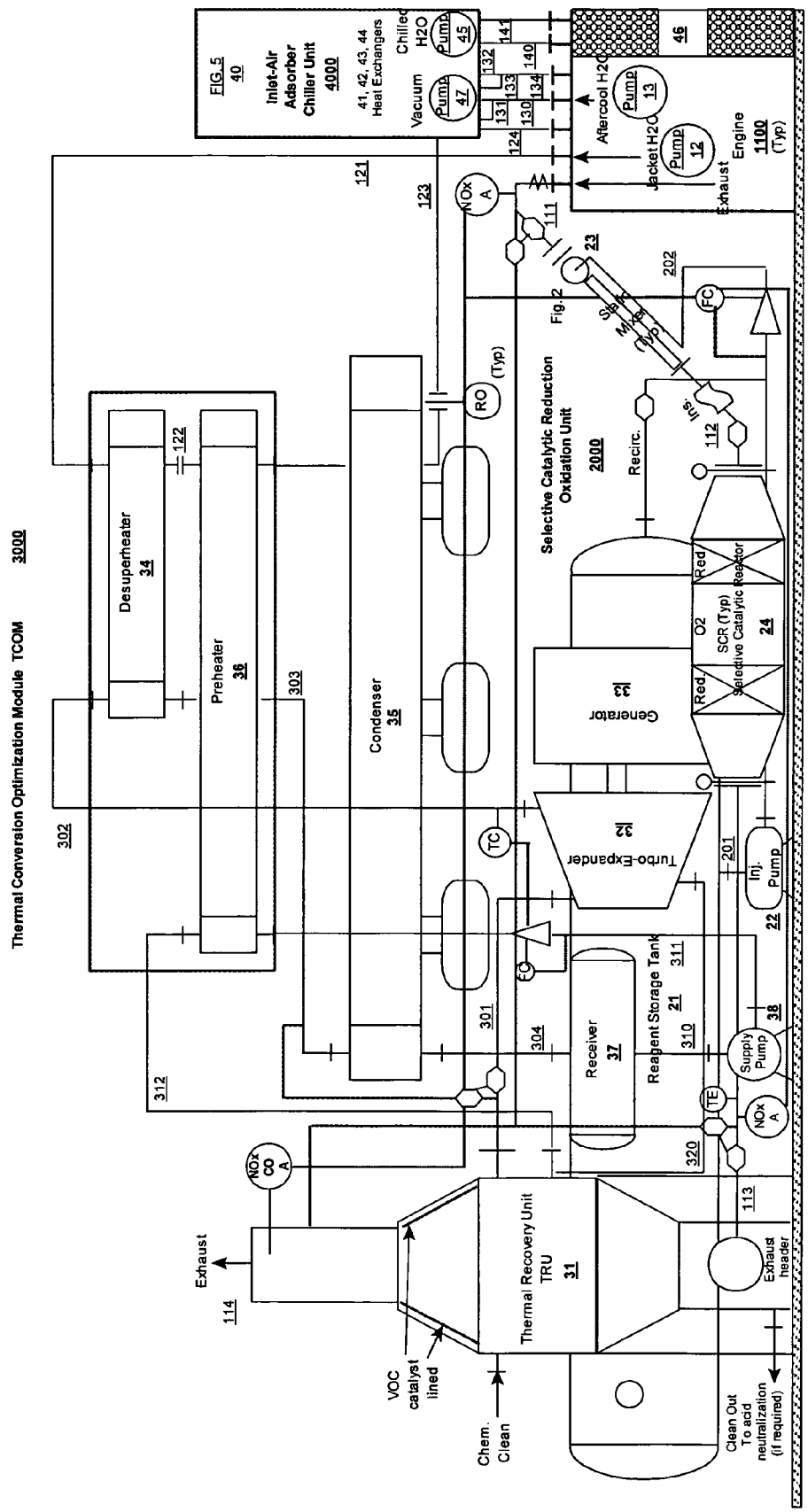
FIG. 6A illustrates a general arrangement drawing of a stationary diesel engine(s) equipped with emissions reduction, thermal recovery and conversion, and combustion air chiller units based on combined exhaust lines and a common exhaust stack, according to an embodiment.
Figure 6B:
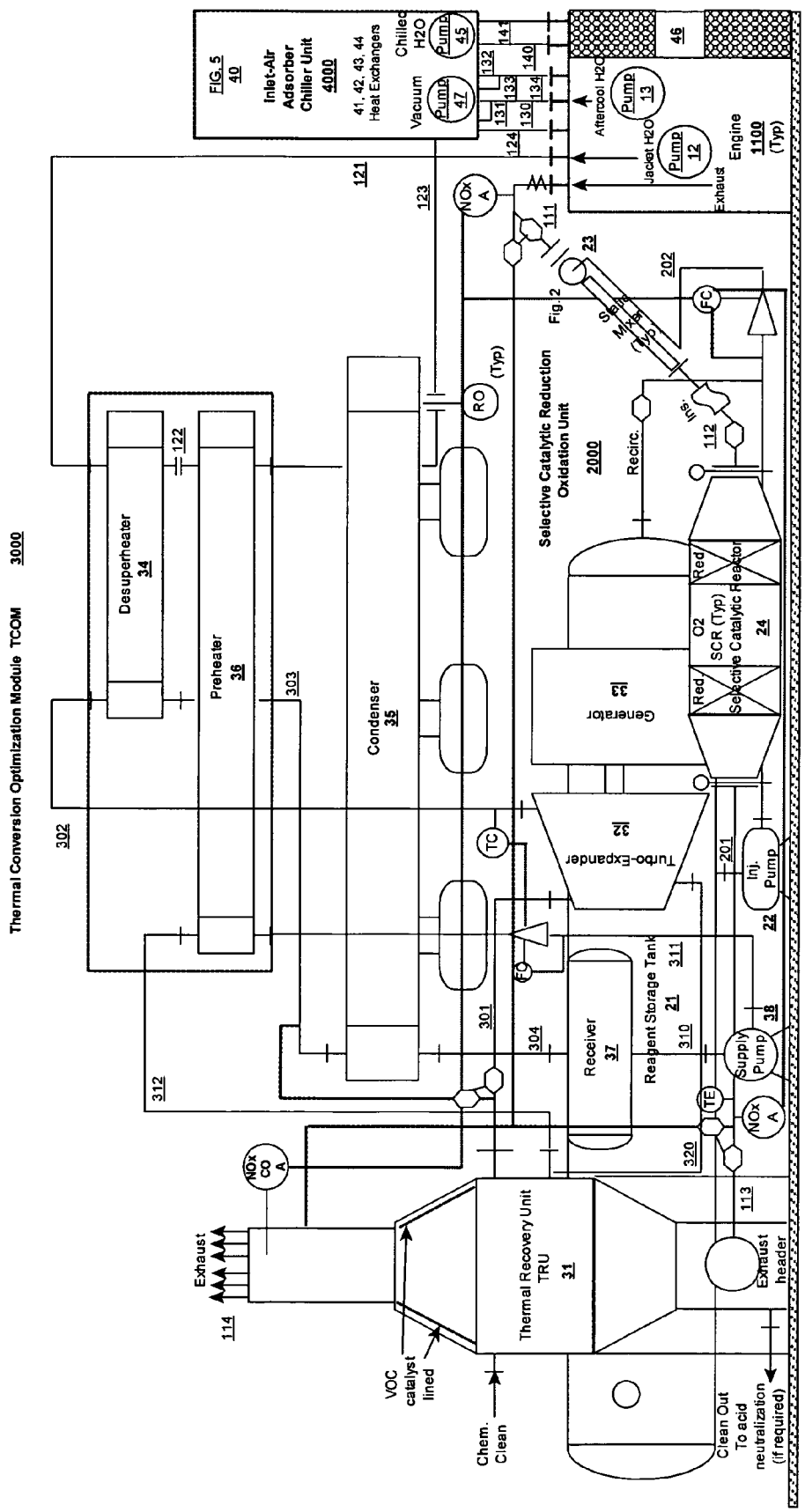
FIG. 6B illustrates a general arrangement drawing of a stationary diesel engine(s) equipped with emissions reduction, thermal recovery and conversion, and combustion air chiller units based on individual exhaust lines and exhaust stacks, according to an embodiment.

FIGS. 6A and 6B illustrate embodiments of a general arrangement of the stationary diesel engine(s) 1100 equipped with emissions reduction 2000, thermal recovery and conversion 3000, and inlet air chiller 4000 units. As seen in FIGS. 6A and B, $NO_x$, CO, $H_2SO_4$, VOCs, and PM emissions 114 may be reduced. The embodiment represented in FIG. 6A combines multiple exhaust streams into a common exhaust stack. In order to allow operation while one or more engines are shutdown, isolation valves are provided in each individual exhaust stream. The embodiment represented in FIG. 6B represents an alternate way to recover heat from multiple exhaust streams. This embodiment utilizes individual exhaust stacks with entirely integral tube-supports so that minimal or no back flow or back-pressure is imposed upon individual engines that may be shut down while others continue to operate.

In some embodiments, a Thermal Conversion Optimization Module TCOM 3000, may include the TRU 31, turbo-expander 32, generator 33, condenser 35, de-superheater 34, pre-heater 36, working fluid storage receiver 37, and working fluid supply pumps 38. In various embodiments, a common working fluid (e.g. anhydrous ammonia) may be used to simultaneously reduce stationary engine(s) 1100 exhaust emissions and convert thermal energy into electricity. In some embodiments, the SCROU 2000 may inject reagent from a storage device 21 via reagent injection pumps 22 to reduce nitric oxides (NOx), oxidize carbon monoxide (CO) and other un-combusted hydrocarbons (e.g. methane CH4). The liquid reagent 202 may be preheated by locating the smaller injection line adjacent to the larger exhaust line, 112 and 111, before injecting through ICSP nozzle 23 for complete vaporization. The SCROU 2000 may also collect particulate matter (PM).

In some embodiments, the Thermal Recovery Unit TRU 31 may also collect particulate matter (PM). The Thermal Recovery Unit TRU 31 may be operated in temperature ranges below acid dew points to remove sulfuric acid, H2SO4. In various embodiments, heated cooling media (jacket water) from the engine(s) 1100 may be utilized to de-superheat the working fluid in vapor form 34 and preheat the working fluid in liquid form 36. The working fluid may be first transferred from its storage receiver 37 to a pre-heater 36 via a supply pump 38 and then via stream 312 enter the Thermal Recovery Unit TRU 31. The working fluid may be vaporized and superheated by the exhaust stream in the TRU 31. The superheated vapor 301 may be expanded in a turbo-expander device 32 which is coupled to an electric generator 33.

In some embodiments, the vapor 302 may exit the turbo-expander device 32 where it is de-superheated in a de-superheater 34 and then as stream 303 it is liquefied in a condenser 35. The liquid from the condenser 304 may be held in a storage receiver 37, and then pumped again through the closed loop Thermal Conversion Optimization Module TCOM 3000. Various embodiments may include an Inlet-air Adsorption Chiller Unit IACU 4000 including an adsorption chiller 40 with two similar heat exchangers, 41 and 42 along with a condenser 44 and an evaporator 43. Silica gel may be used to adsorb and transfer heat. Chilled water may be transferred to an extended surface tubular inlet-air chiller device 46 via pumps 45 where ambient combustion air is cooled and the "heated" water may be returned back to the IACU 4000 to be chilled again and pumped back to 46.

Figure 7A:
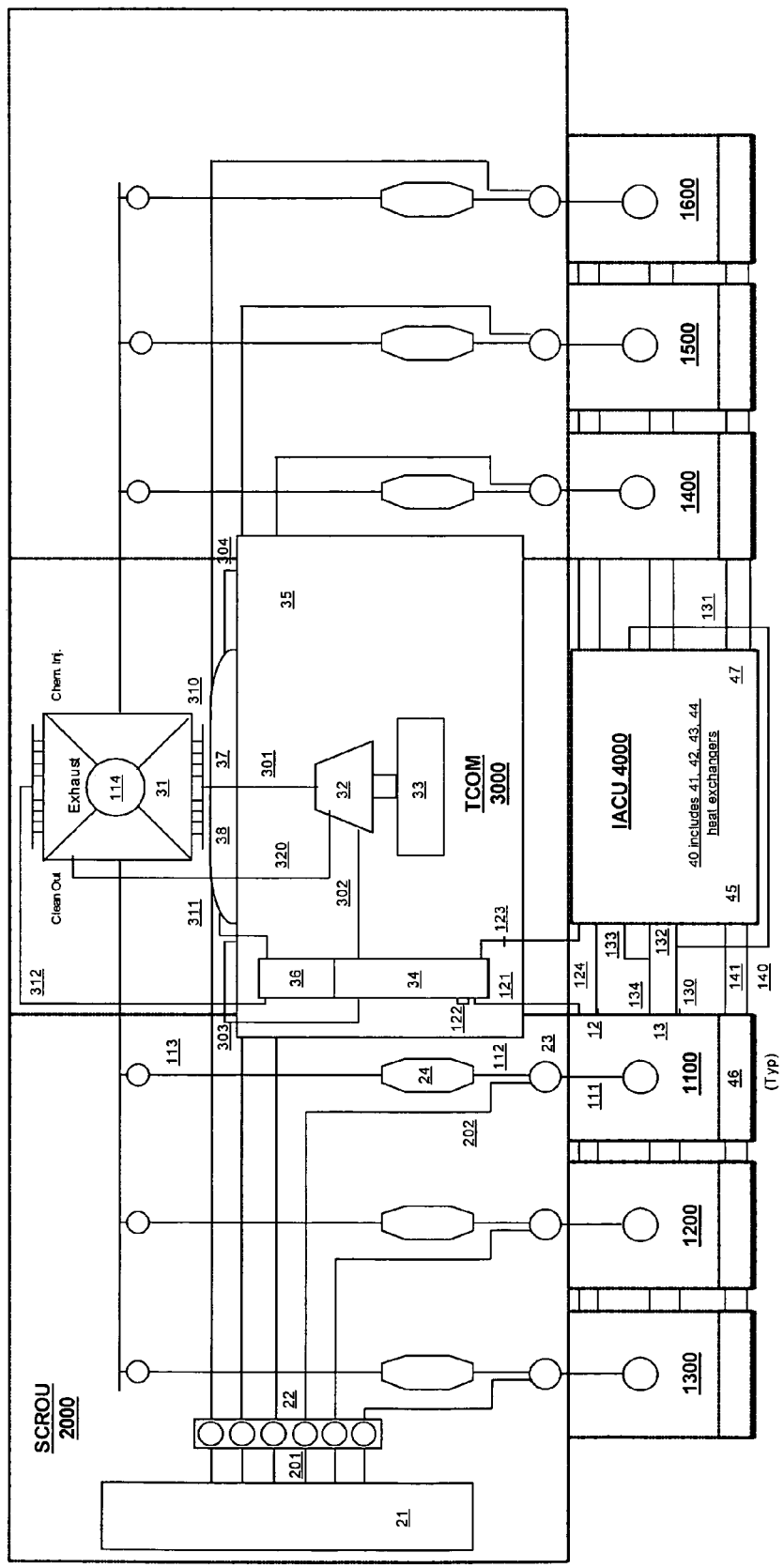
FIG. 7A illustrates a site plan for a stationary diesel engine(s) equipped with emissions reduction, thermal recovery and conversion, and combustion air chiller units based on combined exhaust lines and a common exhaust stack, according to an embodiment.
Figure 7B:
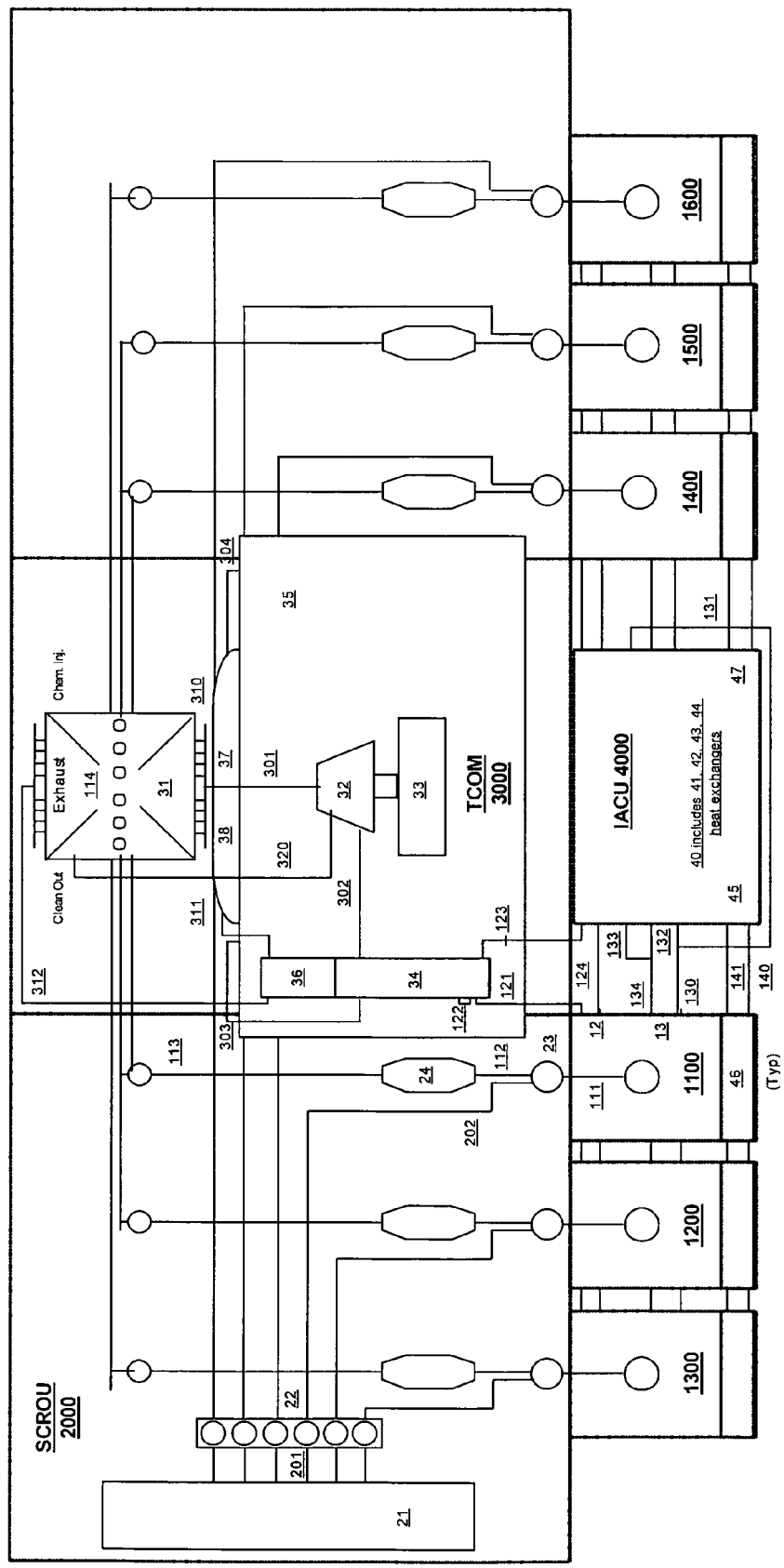
FIG. 7B illustrates a site plan for a stationary diesel engine(s) equipped with emissions reduction, thermal recovery and conversion, and combustion air chiller units based on individual exhaust lines and exhaust stacks, according to an embodiment.

FIGS. 7A and 7B illustrate a site plan for the stationary diesel engine, according to various embodiments. In some embodiments, an integrated exhaust emissions reduction 2000 and thermal recovery and conversion system 3000 for internal combustion engine(s) 1100 may include an SCROU 2000. The ICSP nozzle 23 may vaporize liquid reagent and inject and mix it into an exhaust stream 111. This device may eliminate the need and expense of supplemental heaters and vessels. A combination of both reduction and oxidizing catalysts in the SCR 24 may be used to reduce NOx, CO, and un-combusted hydrocarbons. The design may use a common working fluid, anhydrous ammonia, in the SCROU 2000 and the TCOM 3000. The design may insulate the exhaust line including SCR 24 which will effectively abate noise. Noise levels will be further reduced by redirecting the exhaust stream over extended surface tubes in the TRU 31.

In some embodiments, a condenser 35 may be used to ensure heated cooling media 0acket water and/or after-cooled water) is cooled sufficiently for return back to engine(s) 1100, especially when the Thermal Recovery Unit 31 and/or Inlet Air Chiller Unit 4000 are off-line. Overall engine efficiency defined as the net electric power output plus useful heat output divided by total fuel input may be increased by as much as approximately 16%-25% without burning any additional fuel, if both the $2^{nd}$ and $3^{rd}$ phases of energy recovery are integrated (e.g., see FIG. 8). If condensing phase conditions can be matched to existing cooling-refrigeration systems and/or the exhaust temperature lowered to near ambient to transfer as much heat as possible, the overall efficiency can be increased even higher. In some embodiments, the integrated emissions reduction/oxidation SCROU 2000 and TCOM 3000 described above may operate with intermediate extraction, recycle superheat streams and multiple turbo-expanders. In some embodiments, the integrated emissions reduction/oxidation SCROU 2000 and TCOM 3000 may operate with other working fluids including aqueous ammonia, isobutane, n-butane, propane, isopentane, butane, ethane, ethylene, or any combination of these and other hydrocarbons. Anhydrous ammonia may be less corrosive, less hazardous and less explosive than hydrocarbons with similar physical properties. In some embodiments, the generator in the TCOM 3000 may be replaced by some other device which can utilize the mechanical energy produced in the turbo-expander. In some embodiments, the integrated emissions reduction/oxidation SCROU 2000 and TCOM 3000 may operate with an inlet-air adsorption chiller unit IACU 4000 to provide chilled inlet air for engine combustion. In some embodiments, multiple IACUs 4000 may be used.

The following table summarizes an overall thermal efficiency improvement for an embodiment:

| Overall Thermal Efficiency = | (Net Power output + (Engines with generator) | Net Power output + (TCOM generator) | Useful Heat Output) (TCOM + IACU) | /Total Fuel Input |
|---|---|---|---|---|
| 1100-1600 ENGINES (CAT 3616) | Quantity - 6 | | | |
| Fuel combusted (100% load) | | | | 56,344 kW (1) |
| Engine output (100% load) | 33,660 bhp | | | |
| Generator output (100% load) (0.956 eff) | 24,000 kW | | | |

-continued

| Overall Thermal Efficiency = | (Net Power output + (Engines with generator) | Net Power output + (TCOM generator) | Useful Heat Output) (TCOM + IACU) | /Total Fuel Input |
|---|---|---|---|---|
| Exhaust energy (2) | 18,588 kW | | | 31,126 kW |
| Jacket water energy | 5,698 kW | | | |
| Aftercooler/Lube oil energy | 6,840 kW | | | |
| potentially recoverable energy (to 25° C.) | 31,126 kW | | | |
| Jacket water pump | 60 kW | | | |
| Aftercooler/lube oil pumps | 30 kW | | | |
| Radiant losses | −1,218 kW | | | |
| Thermal efficiency e = W/Qh = (24,000 − 1218)/ 56,344 | 0.40 | | | |
| Exhaust energy available | | | | |
| 2000 SCROU | Quantity - 6 | | | |
| Injection Pumps 103 | | | −4.5 | |
| 3000 TCOM | Quantity - 1 | | | |
| Preheater 36 | | | 3,800 | (4) Based on |
| TRU 31 (3) | | | 16,990 | 110° C. ex. outlet |
| Turbo-expander 32 (0.86 eff.) | | 6,450 | | |
| Generator 33 (0.97 eff.) | | 4,666 | | |
| Desuperheater 34 | | | −3,200 | (5) Based on |
| Condenser 35 | | | −12,450 | 38° C. cond. temp. |
| Motor hp 35 | | | −336 | |
| Supply pump 38 | | | −134 | |
| 4000 IACU | Quantity - 1 | | | |
| Adsorption chiller 40 (0.60 COP) | | | 2,400 | |
| Vacuum pump 47 | | | −1.5 | |
| Chilled water pump 45 | | | −1 | |
| subtotal | | | 2,398 | |
| Overall Thermal efficiency e = W/Qh = (24,000 − 1218)/ 56,344 + (4,666 + 2400)/ 31,126 | | | 0.63 | |

Notes:
(1) Based on a LHV of 42,780 kJ/kg, density of 0.8389 kg/liter, and consumption of 942 liters/h at standard conditions of 100 kPa, 25° C., and altitude of 150 m.
(2) Based on outlet engine exhaust stack temp at ambient of 25° C.
(3) Based on outlet engine exhaust stack temp of 110° C.
(4) Overall efficiencies of 0.65 and higher are possible if exhaust outlet temperature is reduced below 110° C.
(5) Overall efficiencies of 0.65 and higher are possible if condensing temperature is reduced utilizing a cooling water or refrigeration system for condensing.

It is respectfully noted that the numbers provided in the specification (e.g., efficiencies, percent increases/decreases, etc) are to be taken as embodiments. Other numbers are also contemplated. In addition, while various embodiments identify water (e.g., jacket water), other fluids may also be used. Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system, comprising:
   a thermal recovery unit coupled to an exhaust stream of a diesel engine;
   a preheater coupled to the thermal recovery unit, wherein engine coolant from the diesel engine coupled to the preheater preheats a fluid entering the thermal recovery unit, wherein heat from the exhaust stream coupled to the thermal recovery unit is absorbed by the fluid moving through the thermal recovery unit;
   a turbine coupled to the thermal recovery unit, wherein the fluid exiting the thermal recovery unit interacts with the turbine;
   a generator coupled to the turbine, wherein the generator transforms energy transferred to the turbine from the fluid as a result of the interaction between the fluid and the turbine; and
   a desuperheater coupled to the thermal recovery unit, wherein the engine coolant is used to desuperheat the fluid exiting the turbine before the engine coolant enters the preheater.

2. The system of claim 1, wherein the fluid exiting the thermal recovery unit is a superheated vapor.

3. The system of claim 1, wherein the fluid is anhydrous ammonia.

4. The system of claim 1, wherein the fluid moving through the thermal recovery unit is moving through a tube in the thermal recovery unit, and wherein the fluid does not mix with the exhaust stream.

5. The system of claim 1, wherein the thermal recovery unit is configured to cool at least one exhaust stream and condense acid vapors in the at least one exhaust stream.

6. The system of claim 1, wherein the thermal recovery unit is further configured to remove volatile organic compounds (VOCs) from at least one exhaust stream.

7. The system of claim 1, further comprising:
   at least one section of reduction catalyst coupled to the diesel engine; and
   at least one section of oxidation catalyst coupled to at least one section of reduction catalyst, wherein the reduction catalyst and the oxidation catalyst reduce at least one of nitrous oxides compounds, carbon monoxide, un-combusted hydrocarbons, and large diameter particulate matter in the exhaust stream of the diesel engine.

8. The system of claim 7, wherein at least one section of the reduction catalyst and at least one section of oxidation catalyst are in an insulated shell coupled to the diesel engine and wherein an inlet piping system coupled to the insulated shell is configured to heat the fluid.

9. The system of claim 1, further comprising an adsorption chiller coupled to the diesel engine, wherein the adsorption chiller cools inlet combustion air to the diesel engine.

10. The system of claim 9, wherein the adsorption chiller comprises a silica gel adsorption media to lower the temperature of a first water stream used to cool inlet combustion air to the diesel engine, wherein the silica gel adsorption media is regenerated by engine coolant.

11. The system of claim 10, wherein the engine coolant comprises a second water stream and a third water stream, wherein the second water stream is jacket water from the diesel engine and the third water stream is after-cooler water from the diesel engine.

12. The system of claim 9, wherein the first water stream flows through the adsorption chiller and then flows through extended surface tubes in an inlet air duct to the diesel engine.

13. The system of claim 1, further comprising a nozzle for mixing a reagent into the exhaust stream of the diesel engine to remove volatile organic compounds.

14. The system of claim 13, wherein the nozzle comprises:
   a tapered bore;
   a hollow shaft extending through the tapered bore;
   an inverted cone, comprising at least one slotted port, coupled to the hollow shaft;
   wherein a reagent flowing through the hollow shaft contacts the inverted cone and exits through at least one slotted port; and
   wherein the tapered bore creates at least a reduced pressure region near the inverted cone and shields at least one slotted port from direct exhaust stream.

15. The nozzle of claim 14, wherein the end of the inverted cone furthest from the hollow shaft is at least partially sealed.

16. The system of claim 13, wherein the nozzle comprises:
   a rotating disc;
   a hollow shaft extending through the rotating disc; and
   an inverted cone coupled to the hollow shaft, wherein the inverted cone comprises at least one slotted port;
   wherein the exhaust stream interacts with the rotating disc to increase exhaust stream turbulence;
   wherein a reagent flowing through the hollow shaft contacts the inverted cone and exits through at least one slotted port; and
   wherein the reagent interacts with the increased turbulent exhaust stream to mix with the exhaust stream.

17. The nozzle of claim 16, wherein the rotating disc includes at least one slot.

18. A method, comprising:
   preheating a fluid by placing the fluid in thermal contact with engine coolant;
   placing the fluid in thermal contact with an exhaust stream of a diesel engine to further heat the fluid;
   transferring at least part of the absorbed energy of the fluid to a turbine in contact with the fluid;
   transforming energy from the turbine through a generator; and
   cooling the fluid heated by the exhaust stream by placing the fluid in thermal contact with the engine coolant about to enter the preheater.

19. The method of claim 18, further comprising:
   cooling the at least one exhaust stream; and
   condensing acid vapors in the at least one exhaust stream.

20. The method of claim 18, further comprising:
   cooling inlet combustion air to the diesel engine with an adsorption chiller utilizing silica gel adsorption media.

* * * * *